United States Patent Office 3,806,437
Patented Apr. 23, 1974

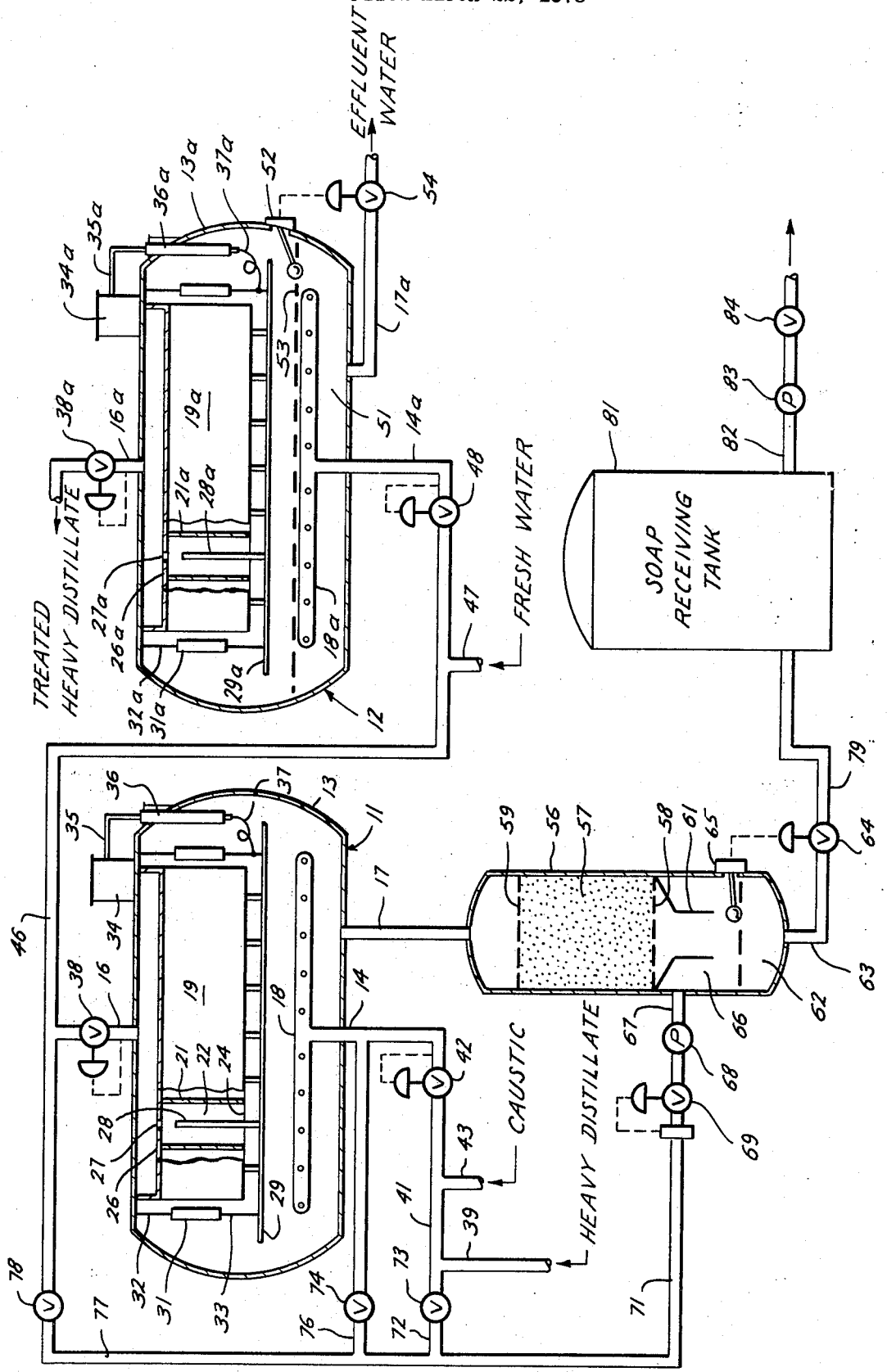

3,806,437
TREATMENT OF PETROLEUM DISTILLATES CONTAINING NAPHTHENIC ACIDS
Albert D. Franse and Frederick D. Watson, Houston, Tex., assignors to Petrolite Corporation, St. Louis, Mo.
Filed Mar. 22, 1973, Ser. No. 343,776
Int. Cl. B03c 5/00
U.S. Cl. 204—190
9 Claims

ABSTRACT OF THE DISCLOSURE

A process for treating a heavy petroleum distillate containing naphthenic acids by the addition of an aqueous metal hydroxide. The resultant mixture, after intimate contact, forms a direct emulsion and concomitantly a small portion of an inverse, mayonnaise-like, water-continuous emulsion. The emulsions are subjected to an electrical field which separates a relatively pure heavy petroleum distillate phase from an aqueous mixture of the metal hydroxide salts of the naphthenic acids and the inverse, mayonnaise-like emulsion. The aqueous mixture is removed promptly from the electric field and then passed downwardly through a bed of porous material, which material is preferentially water wetted whereby the aqueous mixture is substantially and completely separated into a heavy petroleum distillate phase and an aqueous phase containing the metal hydroxide salts of naphthenic acids.

BACKGROUND OF THE INVENTION

(1) Field of the invention

This invention relates to the separation of immiscible liquid mixtures; and more particularly, it relates to the resolution of dispersed water within hydrocarbons by a combination of electrical field treatment and aqueous coalescing media phase resolution.

(2) Description of the prior art

In the refining of crude oils, various distillation and separating procedures are employed which produce a variety of distillates having great commercial value. One of these distillates resides in a boiling range above kerosenes, encompasses the heating oils and other intermediate distillate portions, and with boiling ranges below the lubricating oil stocks. For practical purposes, these distillates are known as heavy petroleum distillates and usually reside within boiling ranges of between about 425° F. and about 675° F. However, some of the heavy petroleum distillates may have initial and end boiling points slightly below and slightly above this range. For various reasons, the preparation of commercial products require treating the heavy petroleum distillates with alkaline materials for removing undesired acidulous components. The heavy petroleum distillate is intimately contacted with an aqueous caustic solution of between 4° and 35° Bé. in strength. Usually the aqueous caustic solution is employed in a volumetric ratio between 5 and 25% of the heavy distillate stream being treated. The resultant intimate contacting between the aqueous caustic solution and the heavy petroleum distillate produces an emulsion having a continuous petroleum phase with the aqueous caustic phase carried as a fine dispersion. The resultant emulsion is subjected to a phase separation process, and preferably, to a process employing electrical fields for coalescence of the aqueous caustic phase from the purified heavy petroleum distillate phase. Usually, the electrical field readily coalesces the dispersed aqueous caustic solution from the continuous hydrocarbon phase to produce a product having very commercial acceptable characteristics.

In some cases, and especially in connection with the refining of naphthenic based crude oil, the intimate admixing of an aqueous caustic solution into a heavy petroleum distillate produces not only the dispersion of the aqueous caustic phase within the continuous heavy petroleum distillate phase, but concomitantly, there is formed a small portion of an inverse, mayonnaise-like, water-continuous emulsion. In the inverse emulsion, a small portion of the heavy petroleum distillate is dispersed within the aqueous phase formed of the aqueous metal hydroxide and naphthenic acid salts thereof. Not all naphthenic based crude oils produce this inverse, mayonnaise-like emulsion. In addition, the chemistry responsible for producing such inverse, mayonnaise-like emulsions during the processing of naphthenic based crude oil is not completely understood at this time. Attempts to reproduce the inverse mayonnaise-like emulsion have not always been successful within the laboratory. The inverse mayonnaise-like emulsion has been formed where a relatively large mass or body of the aqueous caustic solution is being intermixed with a smaller volume of the heavy petroleum distillate and in the presence of some stabilizing agent. Reference may be taken to the U.S. Pat. 2,721,833 for a discussion of these types of inverse emulsions. Although the relative amount of the inverse mayonnaise-like emulsion is small, substantial problems are created by them in subsequent refining operations.

Various processes have been proposed for avoiding these inverse emulsions. The particular parameters of process control for preventing formation of any inverse mayonnaise-like emulsion are so critical that they cannot be readily carried out in conventional refinery operations. Specialized mixing apparatus for dispersing the aqueous caustic solution into the heavy petroleum distillate has borne promise. However, the relatively precise adjustment of the mixing apparatus requires careful attention by refinery personnel to produce the dispersion of the aqueous caustic phase into the heavy petroleum distillate without producing any significant amounts of the inverse mayonnaise-like emulsion. For example, an apparatus producing this mixing function is shown in U.S. Pat. 2,527,689. This patent also precisely describes the operation of the unique apparatus in preventing the generation of the oil-in-water, inverse type of emulsions.

Although the amounts of the inverse, mayonnaise-like emulsion produced during refinery operation is not great, even relatively small amounts produce difficult-to-handle situations in what otherwise are highly reliable processing equipment. For example, electric field treaters, such as shown in U.S. Pat. 3,342,720, have provided an excellent system for resolving the oil-continuous emulsion containing a very fine dispersion of the aqueous caustic solution within the heavy petroleum distillate. Equipment described in this patent are capable of producing a heavy petroleum distillate without any residual acidity, a water content of less than 1 p.p.m., and a residual sodium ion content of less than .5 p.p.m. The efficiency of the electric field resolution of the oil-continuous emulsion within such industry accepted equipment is clearly indicated by the excellent results obtained in refinery systems. However, no electric field treater can tolerate the entry of the inverse mayonnaise-like emulsion into the electric field. The inverse emulsion will short-circuit the energized electrode assembly to adjacent electrically grounded portions of the treater. For example, the electric field in the treater causes the inverse, mayonnaise-like emulsion to collect as a layer beneath the electric field and above the oil-water interface maintained in such treater. This interface layer of inverse emulsion continues to build in thickness until it reaches the energized electrode assembly within the treater. The inverse emulsion is water-continuous, and its contact with the energized electrode assembly causes a short-circuiting condition in the treater. As a result, the treater suffers loss of its normally high and effective efficiency in separating oil-continuous emulsions into a dispersed aqueous caustic solution phase and the purified heavy petroleum distillate phase.

Prior attempts to correct this problem have required expensive chemical pretreatment and precise quality control of the streams entering the electric field treater. The present invention is directed toward a process where the electric field treaters are arranged to operate without any significant accumulation of water or buildup of an interface layer of the inverse emulsion. The aqueous materials removed from the electric field treater are passed through a special system which resolves the inverse emulsion into a relatively pure continuous phase of the heavy petroleum distillate and in a conglomerated body of the aqueous phase material. The efficiency of separation of the hydrocarbon and aqueous phases is so great that they may be remixed with intimate intermingling without reformation of the inverse mayonnaise-like emulsion previously removed from the electric field treater.

SUMMARY OF THE INVENTION

In accordance with this invention, there is provided a process for treating a heavy petroleum distillate containing naphthenic acids. A first stream of the heavy petroleum distillate and a second stream of an aqueous metal hydroxide are introduced into a common conduit. These streams are then passed through a mixing means operating at a relatively high pressure drop for producing an intense mixing action by which the aqueous metal hydroxide is dispersed within the heavy petroleum distillate forming a direct emulsion. Concomitantly, a small portion of the heavy petroleum distillate is dispersed within the aqueous metal hydroxide and naphthenic acid salts thereof, thereby forming an inverse, mayonnaise-like, water-continuous emulsion. The direct and inverse emulsions are subjected to an electric field to separate the relatively naphthenic acid free heavy petroleum distillate from an aqueous mixture of the metal hydroxide salts of naphthenic acids and the inverse, mayonnaise-like emulsion. The resultant aqueous mixture is promptly removed from the heavy petroleum distillate phase to prevent accumulation of any substantial body of the aqueous mixture in the presence of the electric field. The aqueous mixture is passed downwardly through a bed of porous material, preferably water-wetted. As a result, a substantially complete separation of the heavy petroleum distillate is obtained from the metal hydroxide salts of the naphthenic acids.

DESCRIPTION OF THE DRAWINGS

The drawing is a schematic flow diagram of a two stage treating system for removing acidulous materials from a heavy petroleum distillate in accordance with the process of the present invention.

DESCRIPTION OF SPECIFIC EMBODIMENTS

The process of the present invention may be practiced upon heavy petroleum distillates derived from any type of crude oil or from any hydrocarbon source, and in any suitable electrical field treater capable of resolving electrically water-in-hydrocarbon emulsions. The process is especially suited for the processing of heavy petroleum distillates derived from naphthenic based crude oils. However, the present process may be readily employed with a variety of organic acid containing crude oils which may form at least a small amount of the inverse mayonnaise-like water-continuous emulsions upon intimate contact with aqueous caustic solutions. In particular, the present process may be practiced without requiring an intimate knowledge of the inverse emulsion forming characteristics of the crude oil from which the heavy petroleum distillate is derived.

The present process can be practiced in any suitable electrical field treater which is capable of resolving electrically water-in-hydrocarbon emulsions or dispersions. For example, the apparatus illustrated in FIGS. 7, 8, and 9 of U.S. Pat. 3,342,720 has found an especial utility within the refinery industry for such purposes, and is well suited to carrying out the steps of the present process. However, the construction and operation of the electrical field treater is not critical to the present process. It needs only to provide a suitable electrical field and phase separation conditions in which a purified heavy petroleum distillate phase is separated from a coalesced aqueous mixture comprising aqueous metal hydroxide and naphthenic acid salts. For example, the electrical field treater can employ energized electrodes which are spaced between three and eleven inches from one another. The electrical potential applied to these electrodes can vary in gradient of an effective D.C. electric field between 1,000 and 10,000 volts per inch. The magnitude of the gradient, or the applied potential, within the electrical field of the treater is not critical to the practice of the present process.

Although a single electrical field treater may be employed to carry out the present process, it is preferred to employ two electric field treaters arranged for series flow of the heavy petroleum distillate thereby forming a two stage treatment. Such an arrangement is available commercially as a two stage Electrofining® operation. The term "Electrofining®" is a trademark denoting a process which is commonly employed for the processing of distillates in a refinery by their treatment through the intimate dispersion of a chemical aqueous substance with subsequent electrical field resolution to provide a purified distillate phase.

Referring now to the drawing, there is shown a two stage distillate treating operation conducted with two electrical field treaters 11 and 12 interconnected for series flow of the heavy petroleum distillate. The distillate passes first through the treater 11 and then through the treater 12. The treaters 11 and 12 are shown substantially identical in structure. Therefore, the various elements of these treaters will be described specifically relative only to the treater 11, and it is to be understood that the treater 12 has like elements designated by like reference numerals but carrying the adscript "a" for purposes of the present description.

The treater 11 is formed of a horizontally disposed, cylindrical metal vessel 13 which carries an inlet 14, a distillate outlet 16, and an aqueous mixture outlet 17. The inlet 14 connects to a perforated pipe distributor 18 which extends substantially through the length of the vessel 13. The electrical field within the treater 11 can be of the construction described in U.S. Pat. 3,342,720, and in particular, shown in FIGS. 7, 8, and 9. This treater construction includes a grounded electrode assembly 19 which may take the form of metal plates forming vertical cells 22 with intersecting vertical walls 21. The cells 22 have open bottoms 24 with their upper extremities enclosed by a top cover 26. The top cover 26 carries an orifice 27 in each of the cells 22. The vertical cells 22 may have any configuration, but are preferably rectangular in cross-section with their longitudinal dimension extending vertically at least eight times their horizontal dimension. All fluid flow within the cells 22 passes through the orifices 27 which is arranged to create a pressure drop of a few ounces of water as a restriction to the flow of fluids through top cover 26. However, this small back-pressure created across the orifice 27 is sufficient that the flow through all like-sized orifices 27 in like cells 22 will be at a uniform rate. Thus, the fluids flow upwardly through all of the cells 22 at substantially the same vertical rise within the electric treater 11. The grounded electrode assembly 19 is secured to the vessel 13 in any suitable fashion such as by bolting or welding.

Each of the cells 22 carries an axially disposed energized electrode 28 supported upon a rack 29. The electrode 28 is held in electrical isolation in each cell 22 by insulators 31 carried upon supporting rods 32 and 33.

The electrodes 28 can be energized from any suitable power supply means, but they preferably receive a high potential D.C. current from an external power source. For example, a D.C. power pack 34 is mounted atop the vessel 13 and receives power from polyphase A.C. power sources within the refinery. The power pack 34 includes transformers and rectifier means to produce relatively high potential D.C. currents which are applied to the electrodes 28 through an insulating conduit 35, entrance bushing 36, and a flexible lead 37 connected to the rack 29.

During operation of the treater 11, no body of water is maintained within the lower portion of the electric treater 11, and therefore, the customary level control mechanism is omitted. The outlet 17 is connected to a system for continuously removing the aqueous mixture which accumulates in the lower portion of the treater 11. The aqueous mixture is withdrawn at a rate which prevents any buildup or accumulation of a body of water, or of an inverted emulsion layer having any appreciable thickness. The outlet 16 carries a backpressure valve 38 to insure that the contents of the treater 11 are maintained in the liquid phase. The inlet 14 receives an emulsion formed by the intimate dispersion of an aqueous caustic solution into the distillate phase. For this purpose, the distillate phase is introduced from an inlet conduit 39 through an interconnecting conduit 41 and a pressure-controlled mixing valve 42 into the inlet 14. An aqueous caustic solution is introduced into the conduit 41 from an inlet 43 located upstream of the mixing valve 42. The amount and strength of the caustic solution is adjusted by conventional treating practices to obtain the removal of the aciduous material carried in the heavy petroleum distillate. The caustic solution is usually employed in strengths between 3 and 10 percent by weight and in volumes of between one and ten percent relative to the distillate stream. The mixing valve 42 provides an intimate intermixing of the dispersed aqueous caustic solution within the heavy distillate upstream of the inlet 14. The distillate continuous emulsion passes from the inlet 14 through the distributor 18 and then rises in the vessel 13 upwardly into the electric field provided by the energized electrode 28 in the vertical cells 22. The aqueous material coalesces from the heavy petroleum distillate and gravitates downwardly to the lower extremity of the treater 11. The purified heavy distillate passes through the orifices 27 and then moves upwardly into the outlet 16 for delivery to a subsequent utilization. Generally, the purified heavy distillate is moved through an outlet conluit 46 to the electric treater 12 in a subsequent water washing operation. For this purpose, the purified heavy distillate is intermixed with fresh water introduced into the conduit 46 through an inlet 47. Then, the fresh water and distillate are passed through a pressure controlled mixing valve 48 which produces an intimate dispersion of the fresh water within the heavy distillate prior to its entry into the inlet of 14a of the treater 12. By fresh water, for purposes of the present process, is meant a water which may be potable or any water having a sufficiently low content of inorganic materials that it can remove residual water soluble materials from the purified heavy distillate. The operation of the treater 12 is substantially identical to the treater 11. A water washed and purified heavy distillate stream is removed through the outlet 16a from the treater 12 and sent to a subsequent utilization. However, the treater 12 is arranged to maintain a body of water 51 in its lower extremity by a float controller 52 which monitors the distillate and water interface 53. The controller 52 operates a motor valve 54 in the outlet 17a to remove the effluent water from the treater 12 to a subsequent disposal. Other means for controlling the removal of the body of water 51 from the treater 12 may be used, if desired.

The aqeuous mixture in the treater 11 is promptly removed through the outlet 17 to prevent accumulation of any substantial body of the aqueous mixture in the presence of the electrical field established in the upper extremities of the treater. More particularly, the aqueous mixture is passed downwardly from the outlet 17 into the treating vessel 56 which contains a bed 57 of a porous material which is preferentially water-wetted. In addition, the flow through the outlet 17 is so arranged that at all times at least a small amount of the heavy petroleum distillate flows concomitantly with any of the aqueous mixture through the bed 57.

The bed 57 is secured within the vessel 56 by a subtended perforated plate 58 and a superimposed plate 59. The function of the bed 57 is to resolve the aqueous mixture which contains the inverse mayonnaise-like emulsion and the metal hydroxide salts of naphthenic acids into a relatively pure aqueous phase and a purified heavy petroleum distillate phase. These separated phases pass through a funnel-like discharge member 61 to the lower extremity of the vessel 56. The aqueous phase accumulates as a body 62 which is removed through an outlet 63 in regulated amounts by a motor valve 64 actuated by a level controller 65. The aqueous phase in the body 62 is relatively free of any entrained heavy petroleum distillate. In addition, the aqueous phase forming the body 62 comprises residual metal hydroxide solution and the salts of naphthenic acids which were produced by action of electrical field coalescence within the treater 11. The separated and purified heavy petroleum distillate phase passes downwardly through the bed 57 and member 61 to accumulate in the space 66 above the aqueous phase body 62. The heavy petroleum distillate is removed from the space 66 through an outlet 67 by a pump 68 moving fluid through a backpressure control valve 69 to a subsequent utilization. For example, the heavy petroleum distillate can be sent through branch conduits 71 and 72 and control valve 73 for admixture with the raw heavy distillate entering the system through the inlet 39 into conduit 41. Alternatively, the heavy petroleum distillate from the vessel 56 could be passed without subsequent intermixing of any caustic solution through a control valve 74 in interconnecting conduit 76 for direct entry into the inlet 14 of the electric treater 11. If desired, the heavy petroleum distillate with a sufficient purity can be directly introduced into the conduit 46 for entry into the water washing stage provided by the treater 12. For this purpose, the heavy petroleum distillate is passed into the interconnecting conduit 77 and through a control valve 78 for intermixing with the heavy petroleum distillate in the conduit 46 which flows toward the treater 12. Obviously, the disposition of the heavy petroleum distillate from the vessel 56 will be determined by the type of operation desired within the system, and especially the residual content of the aqueous caustic solutions and salts in the purified distillate phase. Usually the heavy petroleum distillate from the vessel 56 is introduced into the conduit 41 for subsequent admixing with the aqueous caustic solution introduced through the inlet 43 upstream of the mixing valve 42.

The bed 57 is formed of any suitable water-wetted material which is adapted to coalesce water from a hydrocarbon distillate and water mixture. For example, the porous material may be formed of loosely packed particles or chunks of porous or non-porous granular materials in uniform or random contact with each other. These materials may be sand, gravel, clay, coal, carbon, etc. The porosity of the individual particles is not critical as long as the composite bed has sufficiently open channels to permit a flow of hydrocarbon distillate therethrough. In addition, unitary beds of the porous material may be used. For example, a filamentary plastic material, such as an open-pore polyurethane foam, may be used. Alternatively, the porous material can be formed of metallic meshes, wires, and the like. Good results have been obtained with the porous material formed of stainless steel wool. However, other well known porous materials such as loosely packed masses of glass wool, rock wool, synthetic plastic fibers, etc., may be used for the purposes of coalescing water from the hydrocarbon distillate received from the outlet 17 of the electric treater 11. Obviously, the porous material is preferentially water-wetted in the presence of continuous hydrocarbon phases. Unexpectedly, this type of porous material will also resolve the inverse water-continuous emulsion into a purified distillate phase and an aqueous phase collected in body 62 of the vessel 56. This resolution is so effective that extreme remixing of these separated phases does not recreate the inverse water-continuous emulsion.

The mass of the porous material in the bed 57 is sized so as to provide a sufficient residence time to the hydrocarbon distillate that the aqueous mixture is separated into an aqueous phase and the hydrocarbon distillate. For example, the dimension of the porous material in the direction of fluid flow therethrough is such as to provide residence time to the aqueous mixture of at least about 4 minutes or preferably longer. The cross-section in a horizontal plane of the porous material should be such that the velocity of the fluid flow is reduced to a point that it does not cause compacting of the porous material and thereby reduces porosity unacceptably. Also, the amount of water received from the outlet 17 per unit volume of the porous material is not so great as to cause flooding of its open spaces to such an extent to exclude continuous flow of distillate so that the porous material ceases to function in resolving the aqueous material from the inlet 17 into an aqueous phase and a continuous flow of hydrocarbon distillate.

The arrangement of the bed 57 is such that a continuous flow of heavy petroleum distillate is maintained therethrough at all times. Generally, this flow rate provides about 7 to 10 minutes residence time within the bed 57. It will be apparent that there is a relatively small flow of the heavy petroleum distillate, under these conditions, from the inlet 17 with its return through the outlet 67 for subsequent utilization. However, it is desirable at all times to maintain a flow of the petroleum distillate through the bed 57 inasmuch as this flow provides a sweeping function to assist in resolving the aqueous mixture received from the outlet 17 of the treater 11. More particularly, the bed 57 is so sized in volumetric capacity that it can resolve the maximum amounts of aqueous mixture received from the electric treater 11 through the outlet 17. At no time should the amounts of the aqueous mixture completely fill the pore spaces within the bed 57. Therefore, where the amounts of the aqueous mixture received from the electric treater are relatively large, a relatively large volume is prescribed for the bed 57. However, the continuous operation of the treater 11 and constant removal of the aqueous mixture through the outlet 17 will allow the bed 57 to have a relatively small volumetric capacity compared to the capacity of the treater 11. For example, a heavy petroleum distillate stream in the range of approximately 1700 barrels per hour is passed into the electric treater 11. There will be withdrawn from this treater through the outlet 17 (and recycled by the pump 68) approximately 150 gallons per minute of the petroleum distillate removed from the space 66 within the vessel 56. With this flow treatment, the bed 57 will contain approximately 375 cubic inches of porous material. The amounts of aqueous mixture under these conditions have not been found to be sufficiently large to flood the bed 57.

Preferably, the bed 57 is provided by a pack of stainless steel wool which has a density of about 10 lbs. per cubic feet. A type 430 stainless steel wool, fine grade, is preferred, and this material can be obtained from the Brillo Corporation. The wool is comprised of what appears to be a continuous filament having a width of 0.009 inch and a thickness of 0.002 inch. Examination of the filament under a microscope discloses that one edge was "saw-toothed" in configuration. The filament appeared to be severed partially of its width on the bias, and the severed regions were spaced within a few thousands of an inch apart. Thus, the severed portions provide crevices of substantial extent in the filament with an extremely high surface area exposed to fluid flows. It is believed that this surface area configuration provides for multitudes of coalescing sites and open pore spaces for substantially resolving the aqueous mixture and removing all of the aqueous phase from the heavy distillate received from the outlet 17 of the treater 11 in the inverse emulsion.

The aqueous phase in the body 62 is passed through the valve 64 into an outlet line 79 for transmittal to a subsequent utilization. This material is substantially free of heavy petroleum distillate and comprises a mixture of the metal hydroxide salts of naphthenic acids, residual aqueous metal hydroxide, and other aqueous phase materials derived from the aqueous mixture produced by the treater 11. This material has a relatively high commercial value and is generally commercialized under the name "naphthenic acid soaps." The material is passed from the conduit 79 into a soap receiving tank 81 where it is held in storage until subsequent utilization. For this purpose, the aqueous phase is removed through an outlet 82 by a pump 83 and passed through a control valve 84 to the desired subsequent utilization.

In the operation of the bed 57 in the vessel 56, the action in resolving the aqueous mixture into a relatively pure hydrocarbon phase and an aqueous phase is by a physical phenomenon within the bed 57 and not influenced significantly by the earlier action of an electric field. The aqueous mixture always remains below the electric field within the treater 11 and is resolved by continuous withdrawal and passage through the bed 57 into highly desirable commercial products.

A field test employed a pilot plant which was scaled to represent the action of the electric field treater 11 and the vessel 56. The vessel 56 was a vertically oriented steel pipe having a six inch internal diameter containing a 56 inch depth of fine grade stainless steel wool as earlier described. The steel wool had a volume of 28.8 cubic inches and was formed into a bed having a height of 4.66 feet. As a result, the bed of stainless steel wool had a volumetric capacity of 1610 cubic inches. A slip stream was taken from an electric treater which was processing a mixture of straight run heavy fuel oil being treated with 4–6 Bé. caustic in a horizontal 12 foot by 30 foot, two stage electric treater substntially similar to electric treater 11. When the formation of the inverse mayonnaise-like water-continuous emulsion occurred, the treater could easily contain a layer two to four inches in depth. This layer would then build rather quickly to depths of fifteen to eighteen inches until reaching sufficient thickness to short-circuit the electric field within the vertical cells contained in the treater. Analysis of the mayonnaise-like emulsion indicated a volumetric content of 15% aqueous phase and 85% hydrocarbon phase. A variable sampler was employed upon the electric treater. Inverse emulsions removed from the interface layer ranging in composition from 10% oil and 90% caustic to 10% caustic and 90% oil. This aqueous mixture stream was passed through the bed of steel wool with a continuous stream of fuel oil which produced high separation efficiencies into a relatively pure fuel oil phase and an aqueous phase containing little residual hydrocarbon. The rate of petroleum distillate withdrawn from the lower extremity of the vessel containing the bed of stainless steel wool was at rates not exceeding about 0.35 gallons per minute. The resultant aqueous phase removed from the lower portion of the pilot plant treater was a clear, mahogany colored liquid. In addition, attempts to reform the inverse mayonnaise-like emulsion by combining the separated fuel oil and aqueous caustic solution with intimate contact were unsuccessful. The function of the stainless steel wool apparently changed the physical composition of the stabilizing surfactants in such a manner that the inverse emulsion cannot be readily reformed from the separated aqueous and distillate phases.

It will be apparent that a periodic and unexplained problem occurs through the creation of the inverse mayonnaise-like emulsion during the treatment of heavy petroleum distillates with aqueous caustic solutions. This problem can be easily rectified, not by following the prior art attempts in control of the mixing of the caustic solution and raw petroleum distillate, but rather in the novel treatment of the problem inverse emulsion. As mentioned, the inverse mayonnaise-like water-continuous emulsion occurs for reasons that cannot be readily explained nor predicted. Continuous and immediate removal of the aqueous mixture from the electric treater 11 and its passage through the bed 57 is a complete prevention of the priorly mentioned problems. In addition, the separated petroleum distillate is generally of a quality such that it can be combined with the treated petroleum distillate removed from the treater 11 through the outlet 16. Furthermore, the aqueous phase produced by functioning of the bed 57 is a relatively pure soap material with a high concentration of naphthenic acid materials and very little residual petroleum distillate which is a commercial product of considerable value.

From the foregoing, it will be apparent that there has been described a novel process for treating a heavy petroleum distillate containing naphthenic acids without the problems heretofore encountered during refinery process operation. Various modifications and alterations in the desired process will be apparent to those skilled in the art which do not depart from the spirit of the present invention. For this reason, these changes are desired to be included within the scope of the appended claims. The appended claims define the present invention; the foregoing description is to be employed for setting forth the present invention embodiments as illustrative in nature.

What is claimed is:

1. A process for treating a heavy petroleum distillate containing naphthenic acids comprising:
    (a) introducing a first stream of the heavy petroleum distillate and a second stream of an aqueous metal hydroxide into a common conduit;
    (b) passing the first and second streams of heavy petroleum distillate and aqueous metal hydroxide from the conduit through a mixing means operating at a relatively high pressure drop, thereby producing an intense mixing action by which the aqueous metal hydroxide is dispersed within the heavy petroleum distillate forming a direct emulsion and concomitantly a small portion of the heavy petroleum distillate is dispersed within said aqueous metal hydroxide and naphthenic acid salts thereof, thereby forming an inverse, mayonnaise-like water-continuous emulsion;
    (c) subjecting said direct and inverse emulsions to an electrical field to separate a relatively naphthenic acid-free heavy petroleum distillate phase from an aqueous mixture of the metal hydroxide salts of naphthenic acids and the inverse, mayonnaise-like emulsion, and promptly removing said aqueous mixture from the heavy petroleum distillate phase to prevent accumulation of any substantial body of said aqueous mixture in the presence of the electric field;
    (d) passing the aqueous mixture of the metal hydroxide salts of naphthenic acids and the inverse mayonnaise-like emulsion downwardly through a bed of porous material preferentially water-wetted whereby a substantially complete separation of the heavy petroleum distillate is obtained from the metal hydroxide salts of naphthenic acids.

2. The process of claim 1 wherein said porous material is stainless steel wool.

3. The process of claim 1 wherein a small stream of the purified heavy petroleum distillate is passed continuously downwardly through said porous material with said aqueous mixture.

4. The process of claim 1 wherein the heavy petroleum distillate separated by action of said porous material is combined with the heavy petroleum distillate separated by the electric field.

5. The process of claim 4 wherein the combined portions of heavy petroleum distillate are intimately contacted with wash water and separated into a highly purified heavy petroleum distillate substantially free of metal hydroxide salts of naphthenic acids and a wash water carries extracted metal hydroxide salts of naphthenic acids.

6. The process of claim 4 wherein the separation of the combined portions of heavy petroleum distillate and wash water is effected under the influence of an electric field.

7. The process of claim 1 wherein the inverse mayonnaise-like emulsion is aqueous phase continuous and contains more than 50% by volume of the heavy petroleum distillate.

8. The process of claim 7 wherein the inverse mayonnaise-like emulsion contains between 50% and 95% by volume of the heavy petroleum distillate.

9. The process of claim 1 wherein the heavy petroleum distillate is mixed with aqueous metal hydroxides in amounts between one and 10% by volume and in strengths between 3 and 10% by weight of the metal hydroxide in water.

References Cited
UNITED STATES PATENTS

| | | | |
|---|---|---|---|
| 2,182,145 | 12/1939 | Eddy | 204—190 |
| 2,785,126 | 5/1957 | Metcalf | 204—190 |
| 2,823,181 | 2/1958 | Packie et al. | 204—190 |

THOMAS M. TUFARIELLO, Primary Examiner